US007009323B1

(12) United States Patent
Simofi-Ilyes et al.

(10) Patent No.: US 7,009,323 B1
(45) Date of Patent: Mar. 7, 2006

(54) ROBUST COMMUTATOR BAR ANCHORING CONFIGURATION WITH DOVE-TAILED FEATURES

(75) Inventors: Attila Simofi-Ilyes, London (CA); Andrew Lakerdas, London (CA); Steven Russell Van Horne, St. Thomas (CA); John Van Duynhoven, St. Thomas (CA)

(73) Assignee: Siemens VDO Automotive Inc., London (CA)

( * ) Notice: Subject to any disclaimer, the term of this patent is extended or adjusted under 35 U.S.C. 154(b) by 0 days.

(21) Appl. No.: 11/037,710

(22) Filed: Jan. 18, 2005

Related U.S. Application Data

(60) Provisional application No. 60/633,578, filed on Dec. 6, 2004.

(51) Int. Cl.
*H02K 13/00* (2006.01)

(52) U.S. Cl. ...................................... 310/235; 310/233

(58) Field of Classification Search ................ 310/233, 310/235, 234, 42, 136, 236, 132; 29/597; H02K 13/00
See application file for complete search history.

(56) References Cited

U.S. PATENT DOCUMENTS 1,898,929 A * 2/1933 Apple et al. ................ 310/235
2,400,590 A * 5/1946 Meyerhoefer ................ 29/597
2,831,991 A * 4/1958 Perkins ........................ 310/43
3,450,914 A 6/1969 Demerciere
3,492,519 A 1/1970 Kirkwood et al.
3,726,003 A 4/1973 Hellmann et al. ............ 29/597
4,559,464 A 12/1985 Stokes ........................ 310/233
4,598,463 A 7/1986 Gerlach et al. ............... 29/597
4,920,633 A 5/1990 Wojcik ........................ 29/597
5,008,577 A * 4/1991 Wang .......................... 310/233
5,128,578 A 7/1992 Strobl ......................... 310/234
5,129,329 A 7/1992 Clasen ........................ 310/233
5,204,574 A * 4/1993 Kanno et al. ............... 310/233
5,491,373 A 2/1996 Cooper et al. .............. 310/235
5,584,115 A * 12/1996 Takahashi .................... 29/597
5,602,438 A 2/1997 Reisnecker et al. ......... 310/233
5,925,961 A * 7/1999 Sugiyanma ................. 310/237
5,955,812 A * 9/1999 Warner ....................... 310/233
5,996,210 A * 12/1999 Konig .......................... 29/597
6,242,839 B1 6/2001 Cefo .......................... 310/233
6,285,106 B1 9/2001 Oki ............................ 310/233
6,369,484 B1 * 4/2002 Kageyama et al. ......... 310/233

(Continued)

FOREIGN PATENT DOCUMENTS

DE 4214372 4/1993

(Continued)

*Primary Examiner*—Darren Schuberg
*Assistant Examiner*—Heba Elkassabgi

(57) ABSTRACT

A commutator bar (10) includes a body and first and second anchors disposed in spaced relation with each anchor and coupled to a proximal end of the body. A free end of the first anchor (13) extends in a direction towards the proximal end H of the body, and a free end of the second anchor (12) extends in a direction towards a distal end (0) of the body. Third and fourth anchors (17) and (18), are disposed in spaced relation and each have one end coupled to a distal end of the body and a free end extending in a direction towards the proximal end of the body. Fifth and sixth anchors (15) and (16) each have one end coupled to the body at a location between the proximal and distal ends. A free end of the fifth anchor extends toward one side of the body and a free end of the sixth anchor extends toward the other side of body.

23 Claims, 4 Drawing Sheets

U.S. PATENT DOCUMENTS

| | | | | |
|---|---|---|---|---|
| 6,611,077 | B1 * | 8/2003 | Yokomizo et al. | 310/221 |
| 6,664,697 | B1 | 12/2003 | Bowman | 310/232 |
| 6,710,480 | B1 * | 3/2004 | Baumeister et al. | 310/68 B |
| 6,710,500 | B1 * | 3/2004 | Wagner et al. | 310/233 |
| 6,713,931 | B1 * | 3/2004 | Kamiya et al. | 310/235 |
| 6,720,701 | B1 | 4/2004 | Terada et al. | 310/233 |
| 6,844,654 | B1 * | 1/2005 | Potocnik | 310/236 |
| 2003/0193261 | A1 | 10/2003 | Ambrose et al. | 310/233 |
| 2003/0218401 | A1 | 11/2003 | Yoshida et al. | 310/233 |
| 2004/0139595 | A1 | 7/2004 | Hockaday et al. | 29/597 |

FOREIGN PATENT DOCUMENTS

| | | |
|---|---|---|
| JP | 1318527 | 12/1989 |
| JP | 040-38151 | 2/1992 |

* cited by examiner

ROBUST COMMUTATOR BAR ANCHORING CONFIGURATION WITH DOVE-TAILED FEATURES

This Application is based on U.S. Provisional Application No. 60/633,578 filed on Dec. 6, 2004 and claims the benefit thereof for priority purposes.

FIELD OF THE INVENTION

This invention relates to commutators for electric motors (generators) and, more particularly, to an anchoring configuration of the commutator bars.

BACKGROUND OF THE INVENTION

A conventional electric motor is generally described in the U.S. Pat. No. 5,977,666, and the structure and manufacture of commutators are generally described in U.S. Pat. No. 6,242,839 and U.S. Pat. No. 4,872,255.

The functionality of the electrodynamic machines such as motors and generators are based on proper commutation. The proper flow and distribution of the electrical energy to the armature windings is commonly solved by the use of commutators and brushes. In a permanent magnet direct current brush motor (PMDC BM) assembly the commutator bar segments are electrically connected to the armature windings and at least one pair of brushes (one positive and one negative) are in contact with the surface of the commutator bars. The armature windings are placed onto the core of the armature in a pattern relative to the commutator hooks. The winding pattern and the style of the winding are determined based on the number of magnetic poles (magnet angle) of the electric machine. Furthermore, the brushes are positioned relative to the permanent magnets of the electrical machine. Then, the electrical current is conveyed from a given power source through at least one positive brush to the armature windings. The current conducting windings under the magnetic fields will generate rotational torque on the armature at a desired angular speed to produce mechanical power.

For adequate commutator and brush interface, the commutator surface is machined after the armature winding is completed. Although the best process is selected to perform this operation, there is a certain force (tensile and compressive) transferred to the anchoring system of each commutator bar. Therefore, the anchoring configuration of each bar must be robust enough to withstand the machining forces with acceptable surface conditions such as TIR (Total Indicted Run-out) and BTB (Bar to Bar).

Since the proper function and durable life of an electric machine depends mainly on the robustness of the commutation interface components such as the commutator and brushes, a good motor configuration must ensure that the commutator bars have sufficient thickness and robust anchoring features. More specifically the commutator must withstand high rotational speeds, tensile and compressive forces from the surface cutting operation and thermal and mechanical stresses that may occur during the life of the product.

The current production commutators work well in low power ranges used by most of the auto manufacturers. However, based on forecasts of higher power motor requirements new validation testing was performed using the current commutator and the test results indicated that the current configuration did not provide adequate anchoring for higher power applications. Therefore, there is a need to improve the anchoring structure of the commutator bars for higher power applications.

SUMMARY OF THE INVENTION

An object of the invention is to fulfill the need referred to above. In accordance with the principles of the present invention, this objective is achieved by providing a commutator bar including a body having a top surface and a bottom surface, a proximal end, a distal end and two opposing sides. The top surface is constructed and arranged to contact brushes of a motor. A hook extends from the proximal end of the body and is constructed and arranged to receive a portion of a winding of a motor. A first pair of anchors, a second pair of anchors and a third pair of anchors is provided with each pair extending from the bottom surface. The first pair includes first and second anchors disposed in spaced relation. Each anchor of the first pair has one end coupled to the proximal end of the body. A free end of the first anchor extends in a direction towards the proximal end of the body, and a free end of the second anchor extends in a direction towards the distal end of the body. The second pair of anchors includes third and fourth anchors disposed in spaced relation. Each anchor of the second pair has one end coupled to a distal end of the body and a free end extending in a direction towards the proximal end of the body. The third pair of anchors includes fifth and sixth anchors. Each anchor of the third pair has one end coupled to the body at a location between the proximal and distal ends. A free end of the fifth anchor extends toward one side of the body and a free end of the sixth anchor extends toward the other side of body.

In accordance with another aspect of the invention, a commutator includes a base having a periphery, and a plurality of commutator bars coupled to the periphery of the base. Each commutator bar has a body including a top surface and a bottom surface, a proximal end, a distal end and two opposing sides. The top surface is constructed and arranged to contact brushes of a motor. Each commutator bar has at least one pair anchors. Each anchor has one end coupled to the body at a location between the proximal and distal ends. A free end of one anchor extends beyond one side of the body and a free end of the other anchor extends beyond the other side of body. The anchors engage the base, and the commutator bars are arranged about the periphery of the base such that anchors of one commutator bar overlap a domain of an adjacent commutator bar.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

This invention does not relate to the manufacturing methods of the commutators; however, it identifies that anchoring features can be added to both segmented commutator bars and barrel type commutators. The manufacturing methods of both types of commutators can be found in the prior art. However, for the sake of understanding the differences between segmented and barrel type commutators, a brief description is provided below.

The segmented type commutator is such that each individual bar is manufactured separately, then the bars are positioned in a some type of cylindrical/circular fixture and a base (such as a phenolic based) is molded in at the surface B of the bars (FIG. 1) to hold the bar assembly together.

The barrel type commutator is such that the anchoring features are added to a strip of sheet metal (commonly used copper or copper alloys) that is rolled up to form a cylindrical shape shell. Then, the base is molded into the shell at the surface B of the bars to hold the structure together. Next, at some point of the manufacturing process, the metallic shell is sliced up to electrically isolate the individual commutator bars from each other.

Figure 1:
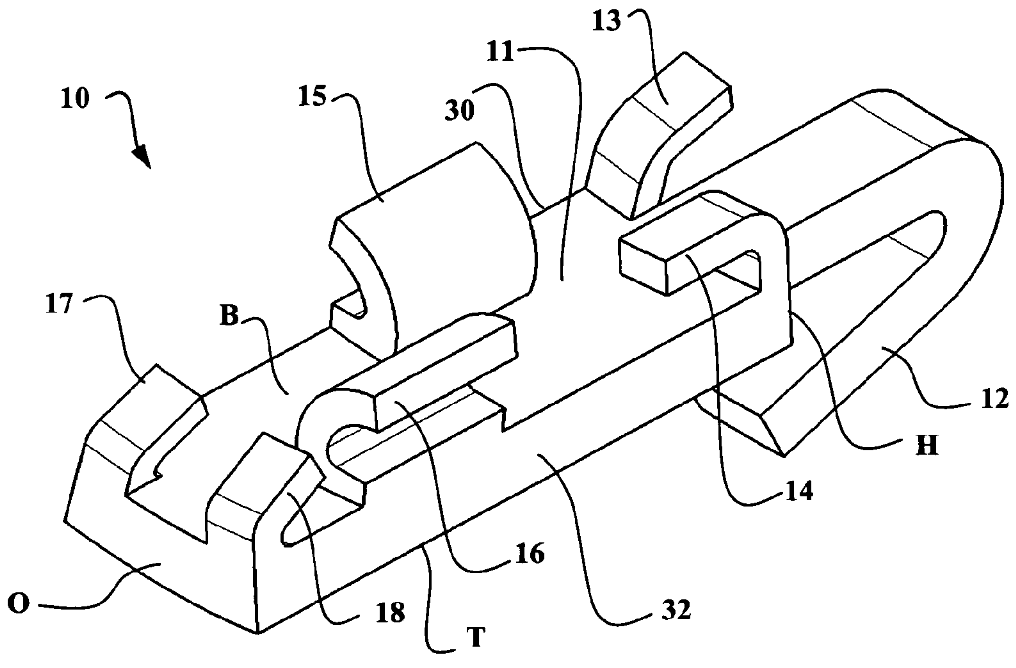
FIG. 1 is a perspective view of a single bar of a twenty bar barrel-commutator showing the anchoring features of the invention.
Figure 2:
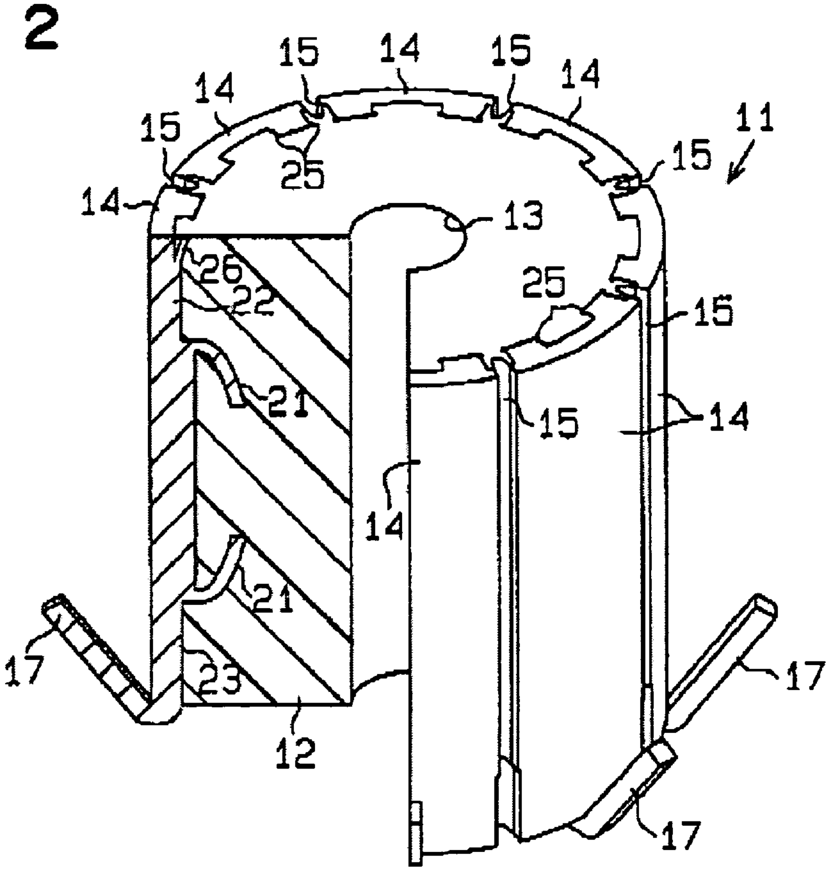
FIG. 2 shows an end view of the commutator bar of FIG. 1, illustrating anchoring features thereof in accordance with the invention.

FIG. 1 and FIG. 2 show only a single commutator bar, generally indicated at 10, of a commutator assembly 20 (FIG. 3) to clearly illustrate the inventive anchoring features. However, the anchoring features of the embodiment can be used in commutators manufactured by both type of manufacturing processes mentioned above, or other types of manufacturing processes.

The commutator bar 10 shown in FIG. 1 has a body 11 defining a bottom surface B, where all the anchoring features are located; a top surface T that is to be in contact with the brushes in a motor assembly in the conventional manner, a proximal end H, a distal end O, and two opposing sides 30 and 32. An armature winding (not shown) is connected and fused to the hook 12 in an armature assembly in the conventional manner. The hook 12 is provided at the proximal end H of the body 11 and preferably integral therewith.

Figure 4:
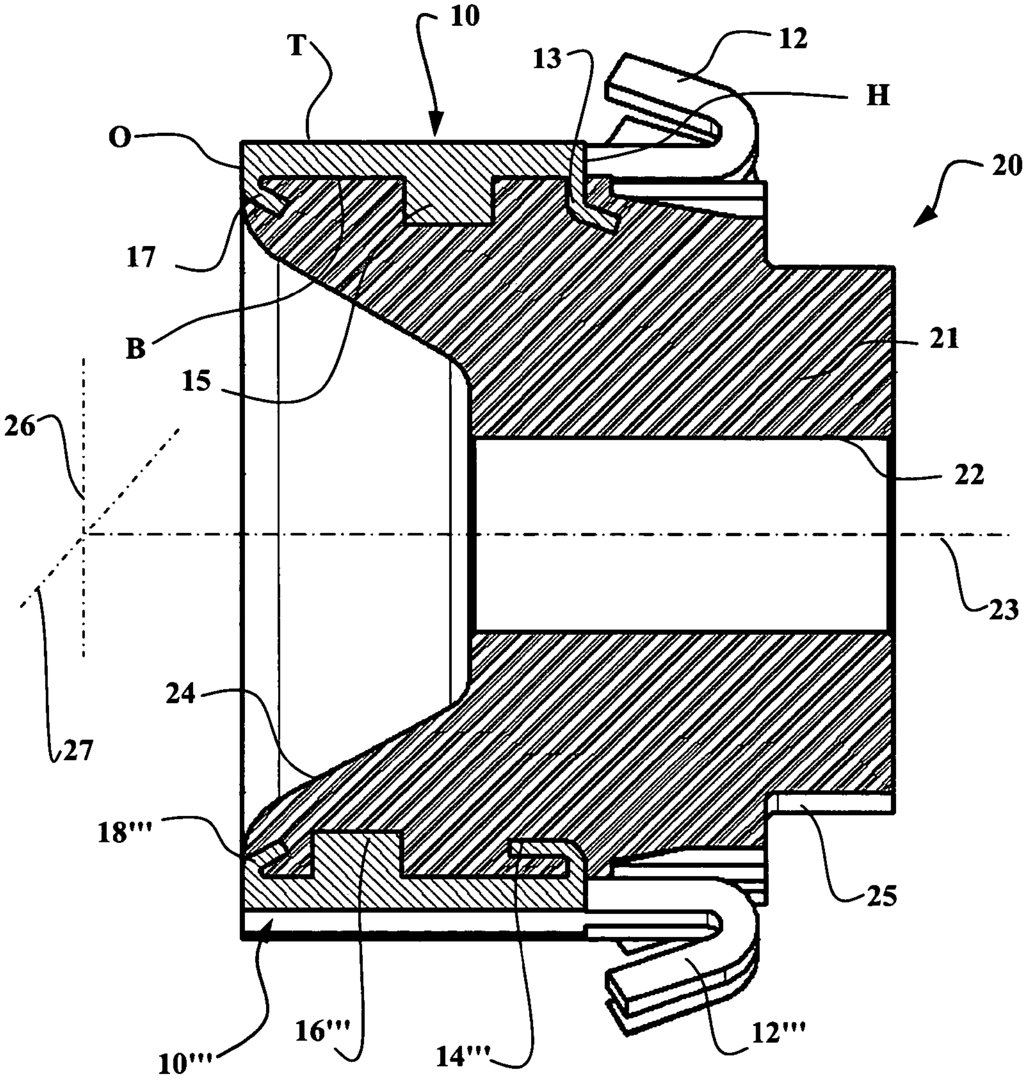
FIG. 4 is cross-sectional view of the commutator of the invention with the molded base.
Figure 2:
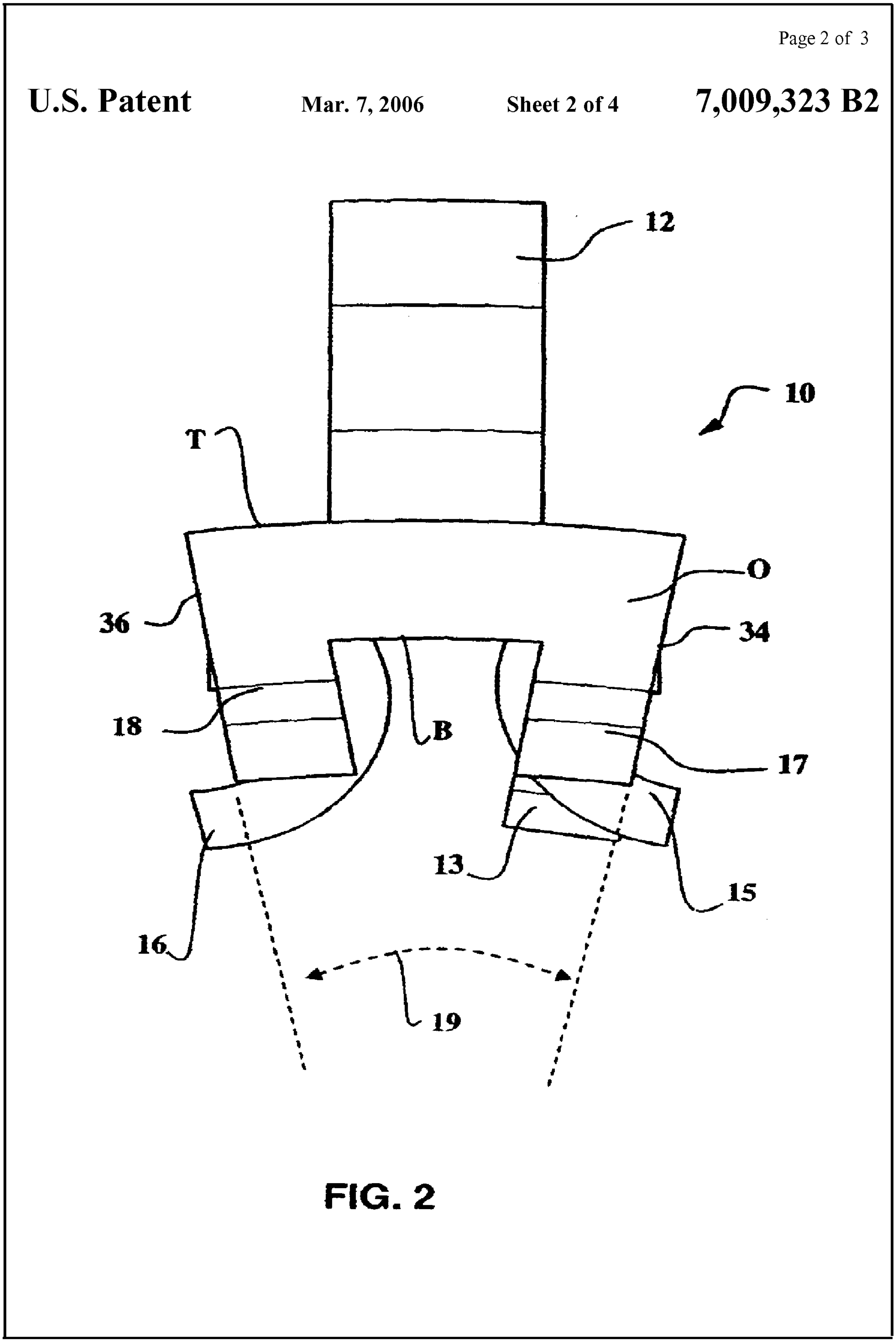
Figure 3:
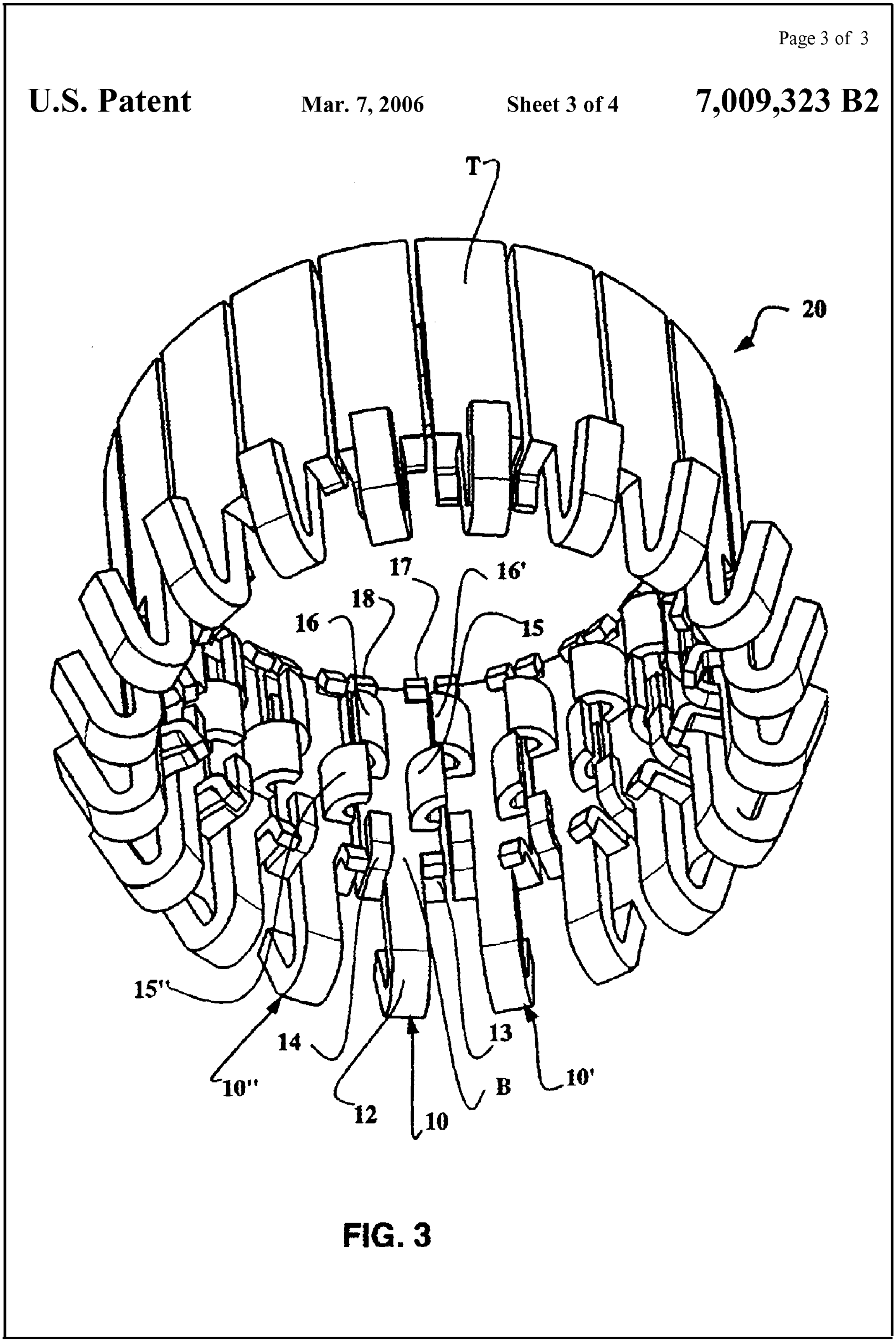

In the embodiment, the anchoring features extending from surface B consist of three pairs of anchors and these anchors are configured and placed such to maximize the degree of freedom of each commutator bar 10 relative to the commutator base 21 and each axis 23, 26, and 27 shown in FIG. 4; where axis 23, 26 and 27 is relative to axis x, y, and z, respectively, of the Global Coordinate System.

As best shown in FIG. 1, the first pair of anchoring features includes a first anchor 13 and a second anchor 14 disposed in spaced relation. Each anchor 13 and 14 has one end coupled to the proximal end H of the body 11. A free end of the first anchor 13 extends in a direction towards the proximal end H of the body 11, and a free end of the second anchor 14 extends in a direction towards the distal end O of the body 11. These dove-tailed anchors 13 and 14 are configured to provide sufficient bar stability to resist a pulling force from the armature winder.

The second group of anchoring features includes a third anchor 17 and a fourth anchor 18 disposed in spaced relation at the distal end O of body 11 to avoid bar lift up in case of the base 21 separates from surface B, since it is known that the base 21 does not bound very well to copper surface B. Each anchor 17 and 18 has one end coupled to the distal end O of the body 11 and a free end extends in a direction towards the proximal end H of the body 11. As shown in FIG. 2, each of the third and fourth anchors 17 and 18 has an outer side surface 34, 36, respectively, defining an acute angle 19 there-between.

The third pair of anchoring features includes a fifth anchor 15 and a sixth anchor 16 that are also dove-tailed anchors and staggered to allow an extension of the anchors 15 and 16 beyond the bounds defined by angle 19 illustrated in FIG. 2. Thus, each anchor 15 and 16 has one end coupled to the body 11 at a location between the proximal and distal ends. A free end of the fifth anchor 15 extends toward side 30 of the body 11 and a free end of the sixth anchor 16 extends towards the other side 32 of body 11. The anchors 15 and 16 are of arcuate shape, preferably generally U-shaped, and are configured to provide bar stability in base 21 during commutator machining, and long-term durability. The anchors 15 and 16 have deep rooting into the base 21 to avoid bar lift-up. Also, each pair of anchoring features is positioned on surface B to provide maximum side support for the commutator bar 10, to minimize the BTB movement, and to eliminate "rocking" type bar movement during the commutator cutting/machining process. BTB is defined as the height difference between the trailing edge of one bar (10) to the leading edge of the adjacent bar (10').

Figure 3:
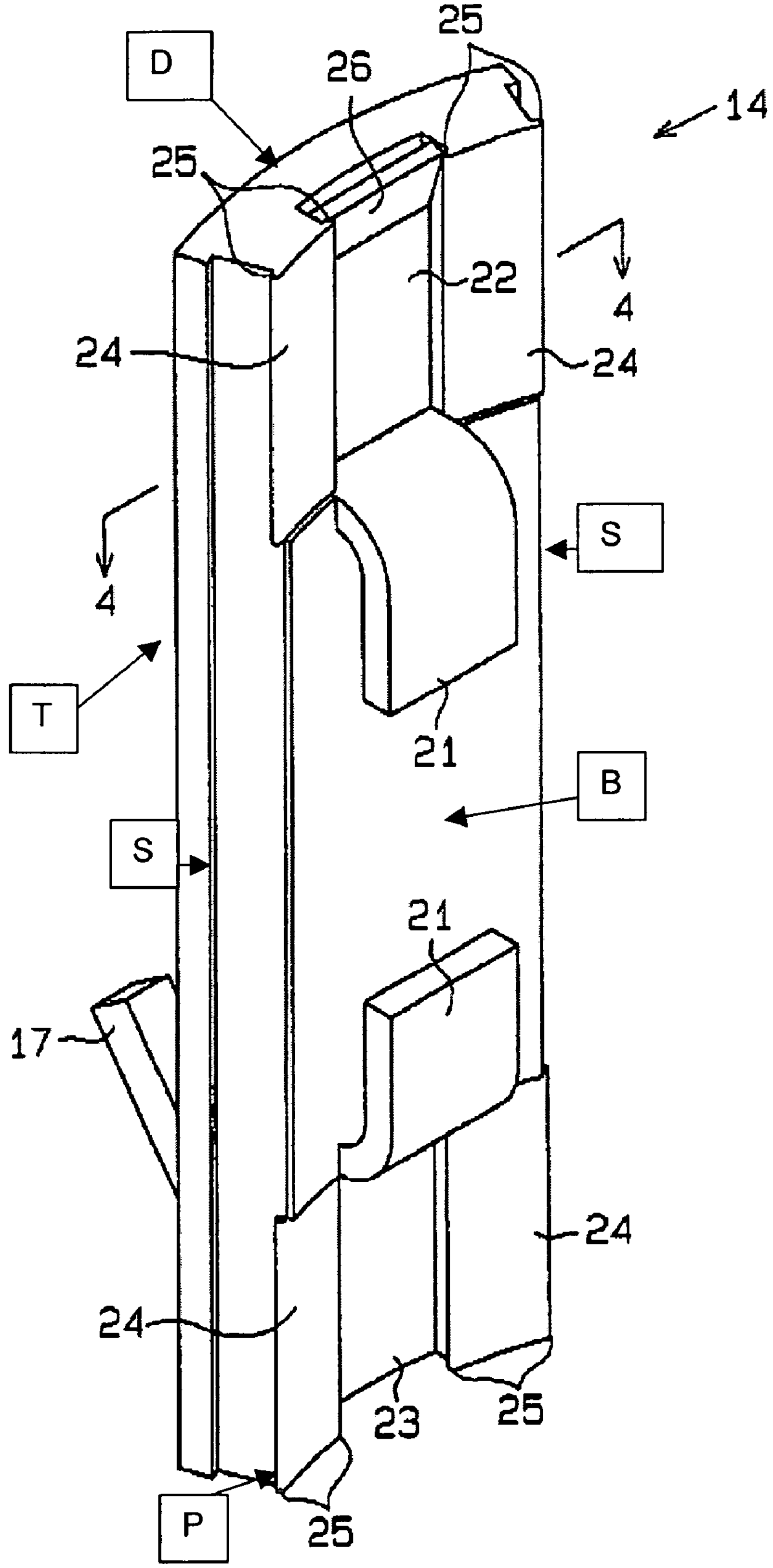
FIG. 3 shows an assembled commutator of the invention, without the molded base, illustrating the position of the anchoring features relative to each other.

FIG. 3 shows the finished commutator 20 of the invention without the molded base 21 to illustrate the position of the anchoring features relative to each other in the final finished commutator. The staggered dove-tailed anchors 15 and 16 on bar 10 overlap into the domain of adjacent commutator bar segments 10' and 10" without interference and electrical contact (e.g., without shorting) with anchors 16' or 15".

A cross-sectional view of the assembled commutator 20 is shown in FIG. 4. At the distal end O, there is a recessed feature 24 of the base 21 to allow a more compact, shorter axial motor assembly. There is a shoulder 25 at proximal end H to support/hold cross-link winding wires for a four pole two brush applications. The commutator has a bore 22 there-through, extending along centerline 23, that is used to press the commutator onto an armature/motor shaft. There are also clearly visible the staggered anchoring features of bars 10 and 10'".

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A commutator bar comprising:

a body having a top surface and a bottom surface, a proximal end, a distal end and two opposing sides, the top surface being constructed and arranged to contact brushes of a motor, a hook extending from the proximal end of the body and constructed and arranged to receive a portion of a winding of a motor, and a pair of anchors, each anchor having one end coupled to the body at a location between the proximal and distal ends, a free end of the one anchor extending toward one side of the body and a free end of the other anchor extending toward the other side of body.

2. The commutator bar of claim 1, wherein the anchors are each of arcuate shape.

3. The commutator bar of claim 1, wherein the free end of the one anchor extends beyond the one side of the body and the free end of the other anchor extends beyond the other side of the body.

4. The commutator bar of claim 1, wherein each of the anchors has an outer side surface so as to define an acute angle between the outer side surfaces.

5. The commutator bar of claim 4, wherein the free ends of the anchors extend beyond the bounds of the acute angle.

6. A commutator bar comprising:

a body having a top surface and a bottom surface, a proximal end, a distal end and two opposing sides, the top surface being constructed and arranged to contact brushes of a motor, a hook extending from the proximal end of the body and constructed and arranged to receive a portion of a winding of a motor, and a first pair of anchors, a second pair of anchors and a third pair of anchors, each pair extending from the bottom surface, wherein the first pair includes first and second anchors disposed in spaced relation, each anchor having one end coupled to the proximal end of the body, a free end of the first anchor extending in a direction towards the proximal end of the body, and a free end of the second anchor extending in a direction towards the distal end of the body, the second pair includes third and fourth anchors disposed in spaced relation, each anchor having one end coupled to a distal end of the body and a free end extending in a direction towards the proximal end of the body, and the third pair includes fifth and sixth anchors, each anchor having one end coupled to the body at a location between the proximal and distal ends, a free end of the fifth anchor extending toward one side of the body and a free end of the sixth anchor extending toward the other side of body.

7. The commutator bar of claim 6, wherein the fifth and sixth anchors are each of arcuate shape.

8. The commutator bar of claim 6, wherein the fifth and sixth anchors are each of generally U-shape.

9. The commutator bar of claim 6, wherein the free end of the fifth anchor extends beyond the one side of the body and the free end of the sixth anchor extends beyond the other side of the body.

10. The commutator bar of claim 6, wherein each of the third and fourth anchors has an outer side surface so as to define an acute angle between the outer side surfaces.

11. The commutator bar of claim 10, wherein the free ends of the fifth and sixth anchors extend beyond the bounds of the acute angle.

12. A commutator comprising:

a base having a periphery, and a plurality of commutator bars coupled to the periphery of the base, each commutator bar having a body including a top surface and a bottom surface, a proximal end, a distal end and two opposing sides, the top surface being constructed and arranged to contact brushes of a motor, each commutator bar having at least one pair anchors, each anchor having one end coupled to the body at a location between the proximal and distal ends, a free end of one anchor extending beyond one side of the body and a free end of the other anchor extending beyond the other side of body, the anchors engaging the base, and the commutator bars being arranged about the periphery of the base such that anchors of one commutator bar overlap a domain of an adjacent commutator bar without electrical contact between adjacent commutator bars.

13. The commutator of claim 12, wherein each commutator bar further includes a hook extending from the proximal end of the body and constructed and arranged received a portion of a winding of a motor.

14. The commutator of claim 12, wherein each commutator bar further includes another pair of anchors including first and second anchors extending from the bottom surface and being disposed in spaced relation, each of the first and second anchors having one end coupled to the proximal end of the body, a free end of the first anchor extending in a direction towards the proximal end of the body, and a free end of the second anchor extending in a direction towards the distal end of the body.

15. The commutator of claim 14, wherein each commutator bar further includes yet another pair of anchors including third and fourth anchors extending from the bottom surface and being disposed in spaced relation, each anchor having one end coupled to a distal end of the body and a free end extending in a direction towards the proximal end of the body.

16. The commutator of claim 12, wherein the anchors are each of arcuate shape.

17. The commutator of claim 12, wherein the anchors are each of generally U- shape.

18. The commutator of claim 12, wherein the base includes a shoulder at one end thereof.

19. The commutator of claim 12, wherein the base includes a recess at one end thereof.

20. The commutator of claim 12, wherein the base has a bore there through.

21. The commutator of claim 12, wherein the base includes a shoulder at one end thereof and a recess at an end opposite the one end.

22. A commutator comprising:

a base having a periphery, and a plurality of commutator bars coupled to the periphery of the base, each commutator bar having a body including a top surface and a bottom surface, a proximal end, a distal end and two opposing sides, the top surface being constructed and arranged to contact brushes of a motor, each commutator bar having means for engaging the base, extending beyond each side of the body, and wherein the commutator bars are arranged about the periphery of the base such that the means for engaging of one commutator bar overlaps a domain of an adjacent commutator bar without electrical contact between the adjacent commutator bars.

23. The commutator of claim 22, wherein the means for engaging includes a pair of anchors, with each anchor being of arcuate shape.

* * * * *

UNITED STATES PATENT AND TRADEMARK OFFICE

CERTIFICATE OF CORRECTION

PATENT NO. : 7,009,323 B1

DATED : March 7, 2006

INVENTOR(S) : Andrew Lakerdas et al.

It is certified that error appears in the above-identified patent and that said Letters Patent is hereby corrected as shown below:

<u>Drawings,</u>

Replace Figs. 2 and 3 as shown on the attached pages.

Signed and Sealed this

Thirtieth Day of May, 2006

JON W. DUDAS

*Director of the United States Patent and Trademark Office*